Feb. 8, 1927.
A. EICHSTEADT
1,617,239
SHIELD LIFTING MECHANISM FOR CULTIVATORS
Filed April 14, 1926   2 Sheets-Sheet 1
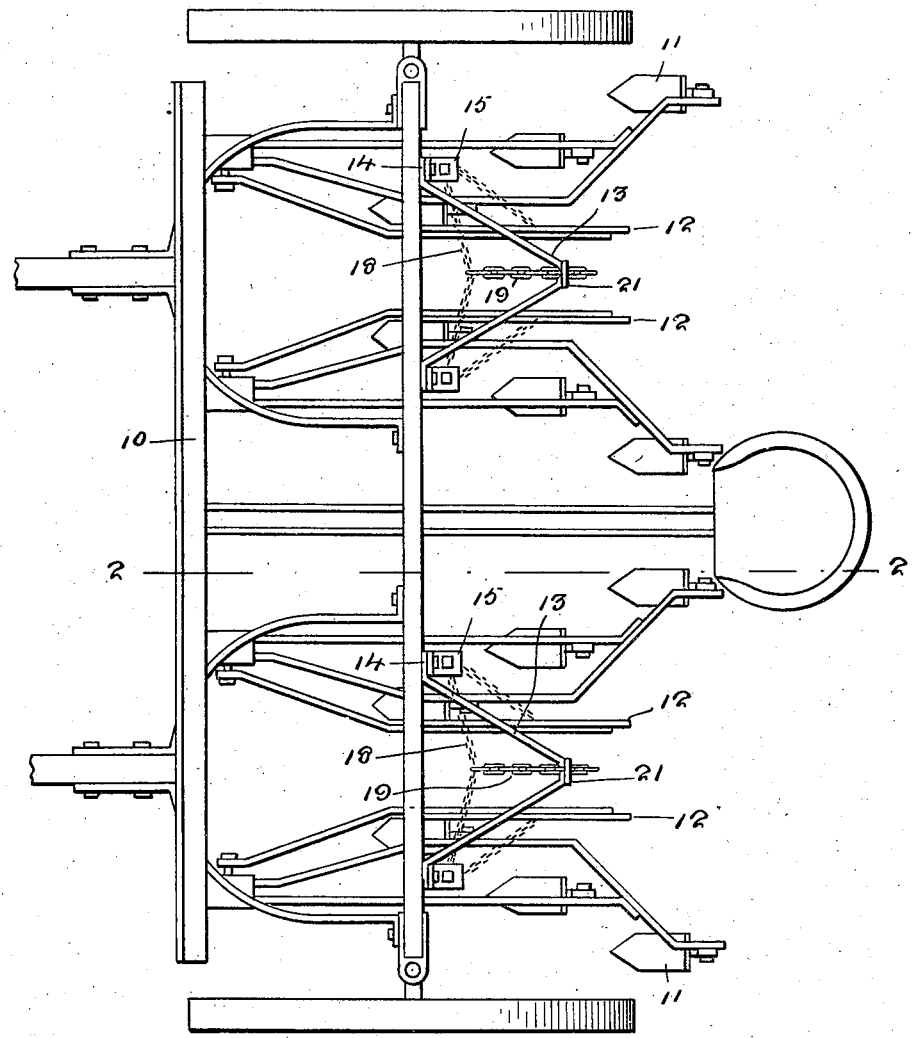

Feb. 8, 1927. 1,617,239
A. EICHSTEADT
SHIELD LIFTING MECHANISM FOR CULTIVATORS
Filed April 14, 1926 2 Sheets-Sheet 2
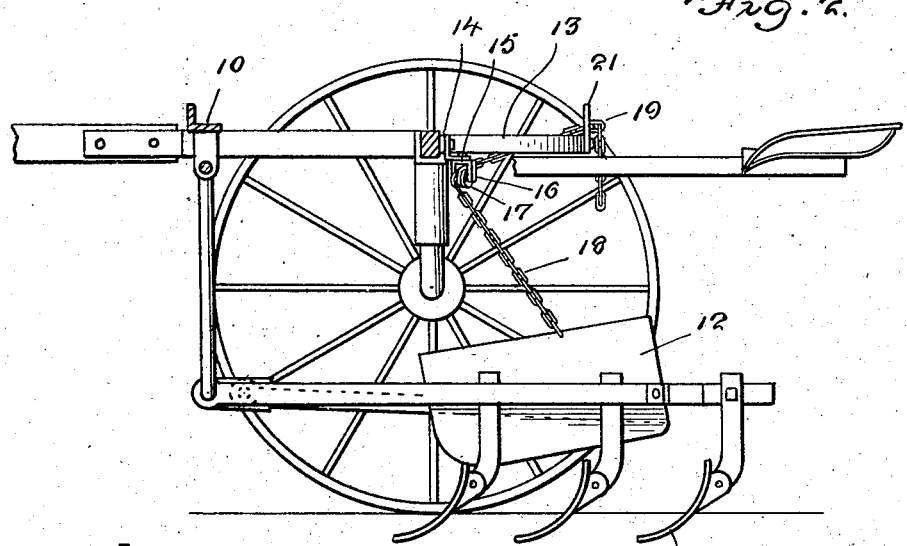
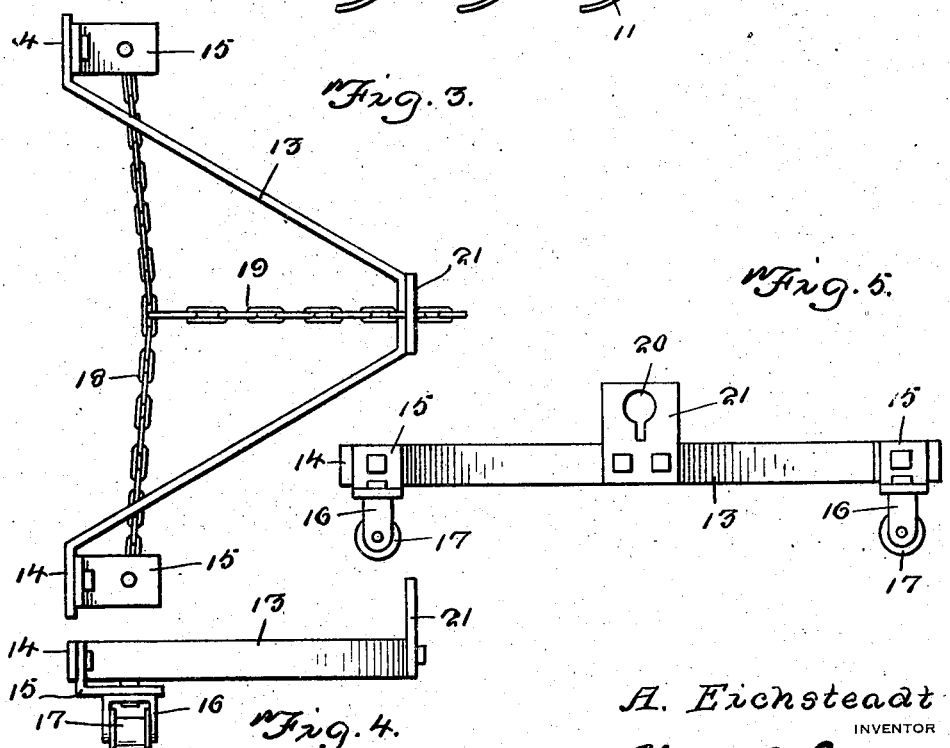

Patented Feb. 8, 1927.

1,617,239

UNITED STATES PATENT OFFICE.

ARTHUR EICHSTEADT, OF FALLS CITY, NEBRASKA.

SHIELD-LIFTING MECHANISM FOR CULTIVATORS.

Application filed April 14, 1926. Serial No. 102,066.

This invention relates to a lifting mechanism attached to a double row cultivator agricultural implement for raising and lowering the shields suspended therefrom in order that such shield may not drag too heavily upon the ground when the cultivator wheels sink too far within the ground.

Another object of the invention resides in the specific construction of the lifting apparatus consisting of a locking mechanism therefor within convenient reach of the operator in order that the shields may be properly raised and lowered from the seat, whereby time and labor are saved owing to the fact that the operation of the cultivator may not be stopped in the raising and lowering of the shields.

With the above and other objects in view, the invention further includes the following novel features and details of construction, to be hereinafter more fully described, illustrated in the accompanying drawings, and pointed out in the appended claims.

In the drawings:

Figure 1 is a top plan view of an agricultural implement showing the above entitled invention applied and used in conjunction therewith.

Figure 2 is a transverse section taken on line 2—2 of Figure 1.

Figure 3 is a top plan view of the invention per se.

Figure 4 is a side elevation of the invention.

Figure 5 is an end elevation thereof.

Referring to the drawings in detail, wherein like characters of reference denote corresponding parts, the reference character 10 indicates the usual and conventional form of two-row cultivator agricultural implement having shovels 11 trailing therefrom in spaced alignment and upon the outer sides of shields 12 positioned upon the opposite sides of the rows cultivated to prevent the growing crop within the row from becoming entirely submerged by the plowings of the shovels 11.

It is the purpose, utility and advantage of the above entitled invention to provide means within convenient reach of the cultivator operator for raising and lowering the shields 12 when the wheels of the cultivator sink down within the top soil or in the instance of the cultivator traveling over hilly ground.

The invention residing in the provision of a substantially V-shaped bracket 13 having outwardly extending offset end portions 14 which are in turn secured upon appropriate portions of the cultivator 10 and which further include at this particular juncture angle plates 15 suspending substantially inverted U-shaped yokes 16 from their under sides for rotatably mounting between the inner side walls thereof spools or pulley wheels, such as indicated at 17. Chain lengths 18 extending across the bracket 13 and trained over the spools or pulleys 17 and having their opposite end portions secured to the upper side edges of the shields 12 in the manner as clearly illustrated in Figure 2 of the drawings. Secured at an intermediate point in the length of the chain lengths 18 are operating chains 19 extending through the apex of the substantially V-shaped bracket 13 and also through a key hole slot 20 provided in a locking plate 21 positioned upon the face of the apex.

In the use and operation of the present invention it is manifest that an outward pull exercised upon the chains 19 will shorten the length of the chain lengths 18 and ultimately raise the lower edges of the shields 12 at an inclination with respect to the top soil when traveling over heavy and hilly ground. By the same token, the chains 19 may release their tension upon the chains 18 for lowering the shields 12 to appropriate levels when traversing hard and dry fields.

The invention is susceptible of various changes in its form, proportions and minor details of construction, and the right is herein reserved to make such changes as properly fall within the scope of the appended claims.

Having thus described my invention, what is claimed is:

1. In a shield lifting device for cultivators, supporting brackets carried thereby, pulleys suspended from said bracket, a chain length trained over said pulleys and connected with the upper edges of the shields, an additional chain connected with the first mentioned chain, and an apertured plate carried by the brackets and adapted to receive and hold the last mentioned chain at a desired point to regulate the pitch and height of the shields.

2. A shield lifting mechanism for use upon cultivators comprising substantially V-shaped brackets secured upon appropriate portions thereof, angle plates secured at the junctures of the end portions of the brackets, substantially inverted U-shaped yokes suspended from the under sides of the angle plates and having pulleys rotatably mounted between the inner side walls thereof, a chain length extending across the bracket and trained over the pulleys and having their opposite end portions secured to the upper edges of the shields, and a chain length connected at an intermediate point in the length of the first mentioned chain length for regulating the length thereof in raising and lowering the shields.

3. A shield lifting mechanism for use upon cultivators comprising substantially V-shaped brackets secured upon appropriate portions thereof, angle plates secured at the junctures of the end portions of the brackets, substantially inverted U-shaped lugs suspended from the under sides of the angle plates and having pulleys rotatably mounted between the inner side walls thereof, a chain length extending across the bracket and trained over the pulleys and having their opposite end portions secured to the upper edges of the shields, a chain length connected at an intermediate point in the length of the first mentioned chain length for regulating the length thereof in raising and lowering the shields, and a locking plate providing a key hole slot therein for reception of the last mentioned chain length for holding the same against accidental displacement and insuring a desired level and inclination of the shields.

In testimony whereof I affix my signature.

ARTHUR EICHSTEADT.